(12) United States Patent
Horne et al.

(10) Patent No.: US 7,779,829 B2
(45) Date of Patent: Aug. 24, 2010

(54) SOLAR THERMAL COLLECTOR MANIFOLD

(75) Inventors: Steve Horne, El Granada, CA (US);
Mary Jane Hale, Sunnyvale, CA (US);
Eric Prather, Santa Clara, CA (US);
Peter Young, San Francisco, CA (US)

(73) Assignee: SolFocus, Inc., Mountain View, CA (US)

( * ) Notice: Subject to any disclaimer, the term of this patent is extended or adjusted under 35 U.S.C. 154(b) by 0 days.

(21) Appl. No.: 12/060,172

(22) Filed: Mar. 31, 2008

(65) Prior Publication Data

US 2009/0241940 A1  Oct. 1, 2009

(51) Int. Cl.
*F24J 2/24* (2006.01)
(52) U.S. Cl. .................. 126/651; 126/655; 126/662; 126/663; 165/173
(58) Field of Classification Search .......... 126/651, 126/655, 670, 671, 677, 666, 667, 662, 663; 165/170, 173, 174, 175
See application file for complete search history.

(56) References Cited

U.S. PATENT DOCUMENTS

| | | | | |
|---|---|---|---|---|
| 980,505 A * | 1/1911 | Emmet | .................. | 126/685 |
| 2,064,141 A * | 12/1936 | Askin | .................. | 29/890.035 |
| 2,200,426 A * | 5/1940 | Lehman | .................. | 165/170 |
| 2,448,648 A * | 9/1948 | Zideck | .................. | 165/170 |
| 3,022,781 A * | 2/1962 | Andrassy | .................. | 126/624 |
| 3,520,803 A * | 7/1970 | Iaconelli | .................. | 210/640 |
| 3,916,871 A * | 11/1975 | Estes et al. | .................. | 126/666 |
| 3,952,724 A * | 4/1976 | Pei | .................. | 126/655 |
| 3,952,725 A * | 4/1976 | Edmondson | .................. | 126/659 |
| 3,960,136 A * | 6/1976 | Moan et al. | .................. | 126/647 |
| 4,000,850 A * | 1/1977 | Diggs | .................. | 126/613 |
| 4,016,860 A * | 4/1977 | Moan | .................. | 126/654 |
| 4,018,215 A * | 4/1977 | Pei | .................. | 126/655 |
| 4,033,327 A * | 7/1977 | Pei | .................. | 126/608 |
| 4,043,318 A * | 8/1977 | Pei | .................. | 126/643 |
| 4,048,982 A * | 9/1977 | Pei | .................. | 126/676 |
| 4,048,983 A * | 9/1977 | Pei | .................. | 126/676 |
| 4,056,094 A * | 11/1977 | Rosenberg | .................. | 126/698 |
| 4,076,016 A * | 2/1978 | Phillips | .................. | 126/663 |

(Continued)

FOREIGN PATENT DOCUMENTS

WO    WO2007/043766 A1    4/2007

OTHER PUBLICATIONS

"Creating Quite a Stir: Tower is Developing Technology for Joining Aluminum That Could Change the Way Cars Are Made-Supply Side: Friction Stir Weld/Roll Bonding—Tower Automotive—Industry Overview" John Peter, http://findarticles.com/p/articles/mi_m3012/is_4_183/ai_100627968/print, Mar. 18, 2008, 3 pages total.

*Primary Examiner*—Kenneth B Rinehart
*Assistant Examiner*—Jorge Pereiro
(74) *Attorney, Agent, or Firm*—Edouard Garcia

(57) ABSTRACT

A solar thermal energy collector manifold is provided. The manifold is connected to solar collector tubes for collecting solar energy. A fluid is used to transfer the heat collected from the collector tubes. The manifold includes an inlet path for receiving the fluid, a fluid flow path for transferring the fluid to the solar collector tubes, and an outlet path for outputting the heated fluid. To facilitate the flow paths, the manifold includes a plate with depressions.

24 Claims, 8 Drawing Sheets

U.S. PATENT DOCUMENTS

| | | | | |
|---|---|---|---|---|
| 4,084,576 A * | 4/1978 | Pei | | 126/657 |
| 4,099,559 A * | 7/1978 | Butt | | 165/170 |
| 4,105,042 A * | 8/1978 | Johnston, Jr. | | 137/245 |
| 4,109,711 A * | 8/1978 | Kleine et al. | | 165/170 |
| 4,112,918 A * | 9/1978 | Palkes | | 126/596 |
| 4,120,286 A * | 10/1978 | Farber | | 126/648 |
| 4,120,351 A * | 10/1978 | Kleine et al. | | 165/170 |
| 4,126,121 A * | 11/1978 | Fairbanks | | 126/668 |
| 4,126,270 A * | 11/1978 | Hummel | | 126/631 |
| 4,134,392 A * | 1/1979 | Livermore et al. | | 126/657 |
| 4,141,341 A * | 2/1979 | Eby | | 126/672 |
| 4,148,293 A * | 4/1979 | Lents et al. | | 126/632 |
| 4,161,809 A * | 7/1979 | Severson | | 29/890.033 |
| 4,187,901 A * | 2/1980 | Coleman et al. | | 165/47 |
| 4,206,748 A * | 6/1980 | Goodman et al. | | 126/668 |
| 4,210,127 A * | 7/1980 | Kleine et al. | | 126/670 |
| 4,222,807 A * | 9/1980 | Farber | | 156/244.13 |
| 4,243,020 A * | 1/1981 | Mier | | 126/670 |
| 4,248,210 A * | 2/1981 | Ortega | | 126/666 |
| 4,255,213 A * | 3/1981 | Redmond | | 148/242 |
| 4,269,172 A * | 5/1981 | Parker et al. | | 126/621 |
| 4,285,335 A * | 8/1981 | Simmons et al. | | 126/660 |
| 4,286,583 A * | 9/1981 | Dunn et al. | | 126/667 |
| 4,312,325 A | 1/1982 | Voges et al. | | |
| 4,321,911 A * | 3/1982 | Offutt | | 126/663 |
| 4,324,028 A * | 4/1982 | Severson | | 29/890.033 |
| 4,338,921 A * | 7/1982 | Harder et al. | | 126/659 |
| 4,346,694 A * | 8/1982 | Moan | | 126/655 |
| 4,452,233 A * | 6/1984 | Goodman et al. | | 126/653 |
| 4,476,896 A * | 10/1984 | Schirmer | | 137/561 A |
| 4,481,975 A * | 11/1984 | Buckley | | 137/561 A |
| 4,548,257 A * | 10/1985 | Williamson | | 165/142 |
| D287,047 S * | 12/1986 | Nygren | | D23/323 |
| 4,631,212 A * | 12/1986 | Shifflett et al. | | 428/35.8 |
| 4,731,072 A * | 3/1988 | Aid | | 604/408 |
| 4,867,133 A | 9/1989 | Sadler | | |
| 4,898,153 A * | 2/1990 | Sherwood | | 126/665 |
| 4,911,201 A * | 3/1990 | Nichols et al. | | 137/561 A |
| 5,163,821 A * | 11/1992 | Kelly et al. | | 417/379 |
| 5,388,567 A * | 2/1995 | Hodak | | 126/626 |
| 5,431,149 A | 7/1995 | Fossum et al. | | |
| 6,247,529 B1 * | 6/2001 | Shimizu et al. | | 165/183 |
| 6,286,213 B1 * | 9/2001 | Hada et al. | | 29/890.044 |
| 6,550,815 B2 * | 4/2003 | Zitkowic et al. | | 285/120.1 |
| 6,598,601 B2 * | 7/2003 | Schutz | | 126/655 |
| 6,622,785 B2 * | 9/2003 | Haegele et al. | | 165/177 |
| 6,817,357 B2 * | 11/2004 | Brunotte et al. | | 126/655 |
| 7,096,885 B2 * | 8/2006 | Van Decker | | 137/561 A |
| 7,147,001 B2 * | 12/2006 | Gamble | | 137/527.4 |
| 7,484,555 B2 * | 2/2009 | Beamer et al. | | 165/174 |
| 2003/0192598 A1 * | 10/2003 | Hobson et al. | | 137/561 A |
| 2007/0193872 A1 * | 8/2007 | Garcia et al. | | 202/234 |

\* cited by examiner

SOLAR THERMAL COLLECTOR MANIFOLD

BACKGROUND

The present invention relates generally to the field of solar thermal energy. In particular, the present invention relates to a manifold for a solar thermal energy collector.

Solar thermal energy collectors convert the energy of the sun into a more usable or storable form. Sunlight provides energy in the form of electromagnetic radiation from the infrared (long) to the ultraviolet (short) wavelengths. The intensity of solar energy striking the earth's surface at any one time depends on weather conditions. On a clear day measured on a surface directly perpendicular to the sun's rays solar energy averages about one thousand watts per square meter. The best designed solar collectors are the ones that collect the most sunlight and are therefore most efficient.

Solar thermal energy collectors can provide heat to hot water systems, swimming pools, floor-coil heating circuit and the like. They may also be used for heating an industrial dryer, providing input energy for a cooling system or providing steam for industrial applications. The heat is sometimes stored in insulated storage tanks full of water. Heat storage may cover a day or two day's requirements.

A solar thermal energy collector that stores heat energy is called a "batch" type system. Other types of solar thermal collectors do not store energy but instead use fluid circulation (usually water or an antifreeze solution) to transfer the heat for direct use or storage in an insulated reservoir. The direct radiation is usually captured using a dark colored surface which absorbs the radiation as heat and conducts it to the transfer fluid. Metal makes a good thermal conductor, especially copper and aluminum. In high performance collectors, a selective surface is used in which the energy collector surface is coated with a material having properties of high-absorption and low emission. The warmed fluid leaving the collector is either directly stored, or else passes through a heat exchanger to warm another tank of water, or is used to heat, for example a building, directly. The temperature differential across an efficient solar collector is typically only ten to twenty degrees centigrade.

Solar thermal energy collectors often include an array of solar collector tubes and a manifold. These systems may be supplied with water from a storage tank located below the collectors. The water is typically circulated by a pump. When the pump is not operating, the water drains from the collectors into the tank. Each solar thermal energy collector may include a housing, a collector panel within the housing and a cavity through which water is circulated with supply and drain pipes. The supply and drain pipes of some of the collectors may be connected to the manifold at bushings which fit into aligned ends of the pipes and fittings. The supply and drain pipes of collectors may also be plugged into the supply and drain pipes of other collectors which are along the manifold, again the connections being at bushing.

A solar thermal energy collector may be made of a series of modular collector tubes, mounted in parallel, whose number can be adjusted to meet requirements. This type of solar thermal energy collector usually consists of rows of parallel collector tubes. Types of tubes are distinguished by their heat transfer method. For example, a U-shaped copper tube may be used to transfer the fluid inside glass collector tubes. In another example, a sealed heat pipe may transfer heat from a collector tube to fluid flowing through the collector tube. For both examples, the heated liquid circulates through the manifold for use or storage. Water heated in such a manner may be stored where it is further warmed by ambient sunlight. Evacuated collector tubes heat to higher temperatures, with some models providing considerably more solar yield per square meter than flat panels.

An array of tube heat exchangers, also referred to as collector tubes, are often placed in a solar thermal panel for easy of transfer and installation. Such a panel may include tubes that are surrounded on each side by two deformed plates. These plates cover each tube and are secured together by rivets which are spaced along and traverse the deformed portions of the plates, thus providing a spring section to absorb unequal expansion of the plates and the fluid conducting pipes.

For efficiency, solar thermal energy collectors are designed to minimize resistance to fluid flow. A common inlet, or manifold, may be used to reduce the resistance to fluid flow, and thus to reduce pressure loss. Collector tubes are typically connected in series or parallel with manifolds made from additional lengths of tubing. These tubes are usually joined by soldering and brazing. Other methods for joining these tubes include coupling with grooves and recesses. Reducing pressure loss increases flow and therefore increases heat exchanged. Soldering and brazing are labor and time intensive techniques which are not entirely suitable for quantity production. An inexpensive, easy to manufacture manifold is desired.

SUMMARY

A solar thermal energy collector manifold is provided. The manifold is connected to solar collector tubes for collecting solar energy. A fluid is used to transfer the heat collected from the collector tubes. The manifold includes an inlet path for receiving the fluid, a fluid flow path for transferring the fluid to the solar collector tubes, and an outlet path for outputting the heated fluid. To facilitate the flow paths, the manifold includes a plate with depressions.

DETAILED DESCRIPTION

Reference now will be made in detail to embodiments of the disclosed invention, one or more examples of which are illustrated in the accompanying drawings.

Solar thermal heating systems typically include an array of solar collector tubes and a manifold. The array of solar collector tubes may be any of those commercially available, and they may be included in a panel with a clear plastic or glass cover. In some solar collector tubes, fluid is circulated through the collector tubes to remove the heat reflected onto an absorber and transport it to an insulated tank, to a heat exchanger or to some other device for using the heated fluid. Sometimes fluid flow tubes are placed within the collector tubes. Sometimes the collector tubes are vacuum sealed tubes. In another example of solar collector tubes, a heat pipe is utilized to transfer the collected solar energy to a fluid in the collector tubes. Any of described type of tubes along with other commercially available solar collector tubes may be used with the present invention.

Figure 1:
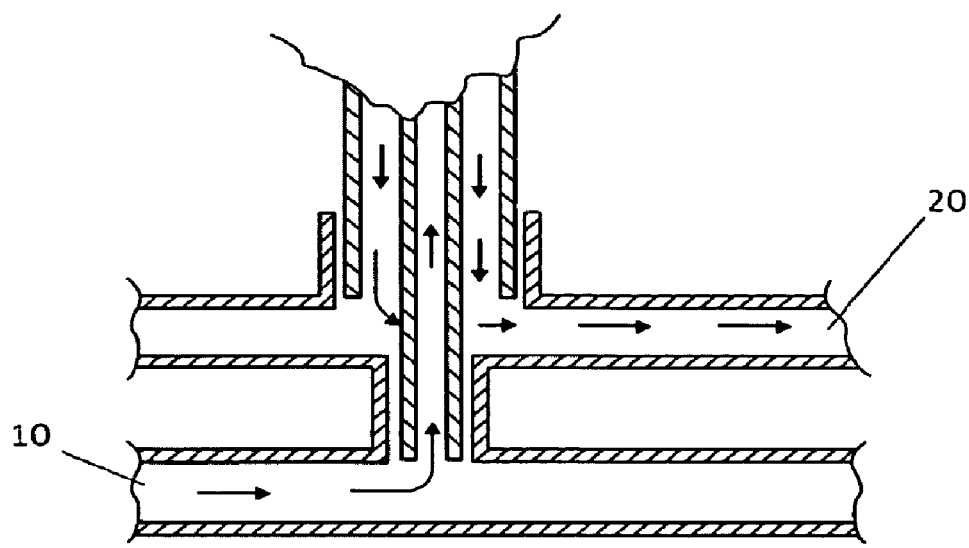
FIG. 1 depicts a cross-section of a traditional manifold including tubing.

These solar thermal collection tubes are typically connected in series or parallel with manifolds adapted from lengths of tube. For example, FIG. 1 depicts a cross-section of a traditional manifold showing fluid flow. Thus, lengths of tube are utilized to facilitate fluid flow entering via inlet 10 and exiting via outlet 20.

Figure 2:
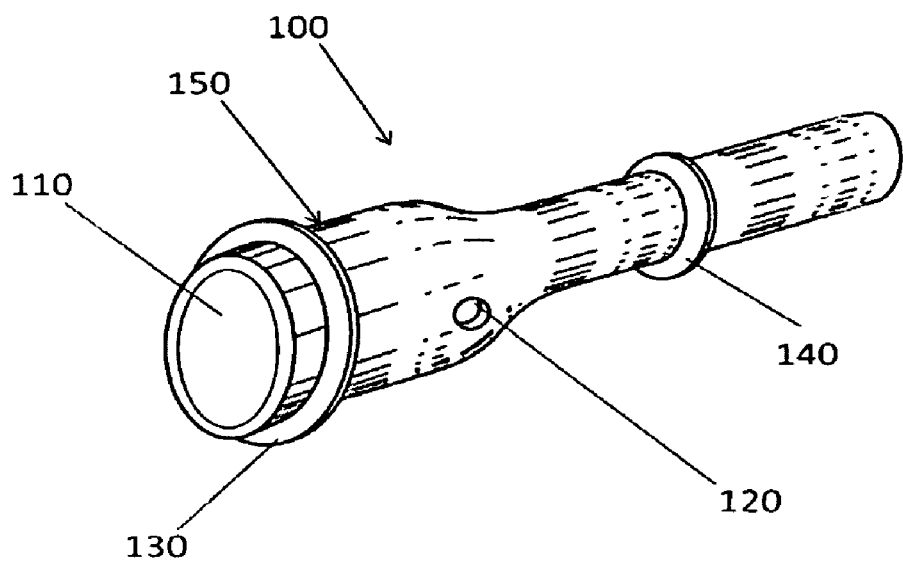
FIG. 2 depicts a machine insert for use in a solar thermal manifold.

FIG. 2 depicts a machine insert 100 for use in a solar thermal manifold. In one embodiment, insert 100 is a screw machine insert, which is drilled longitudinally to allow water to flow along its length. Drilled opening 110 facilitates fluid flow through the solar thermal collector manifold. Thus, drilled opening 110 is end-to-end, along the longitudinal axis of the machine insert. The insert may also be drilled from side-to-side to allow an additional flow path or port 120. The side-to-side, or radial, opening may be used to facilitate cross fluid flow in a, for example, perpendicular direction. Insert 100 may be made of any commercially available material appropriate for such inserts, such as brass, steel, stainless steel or bronze.

Figure 3:
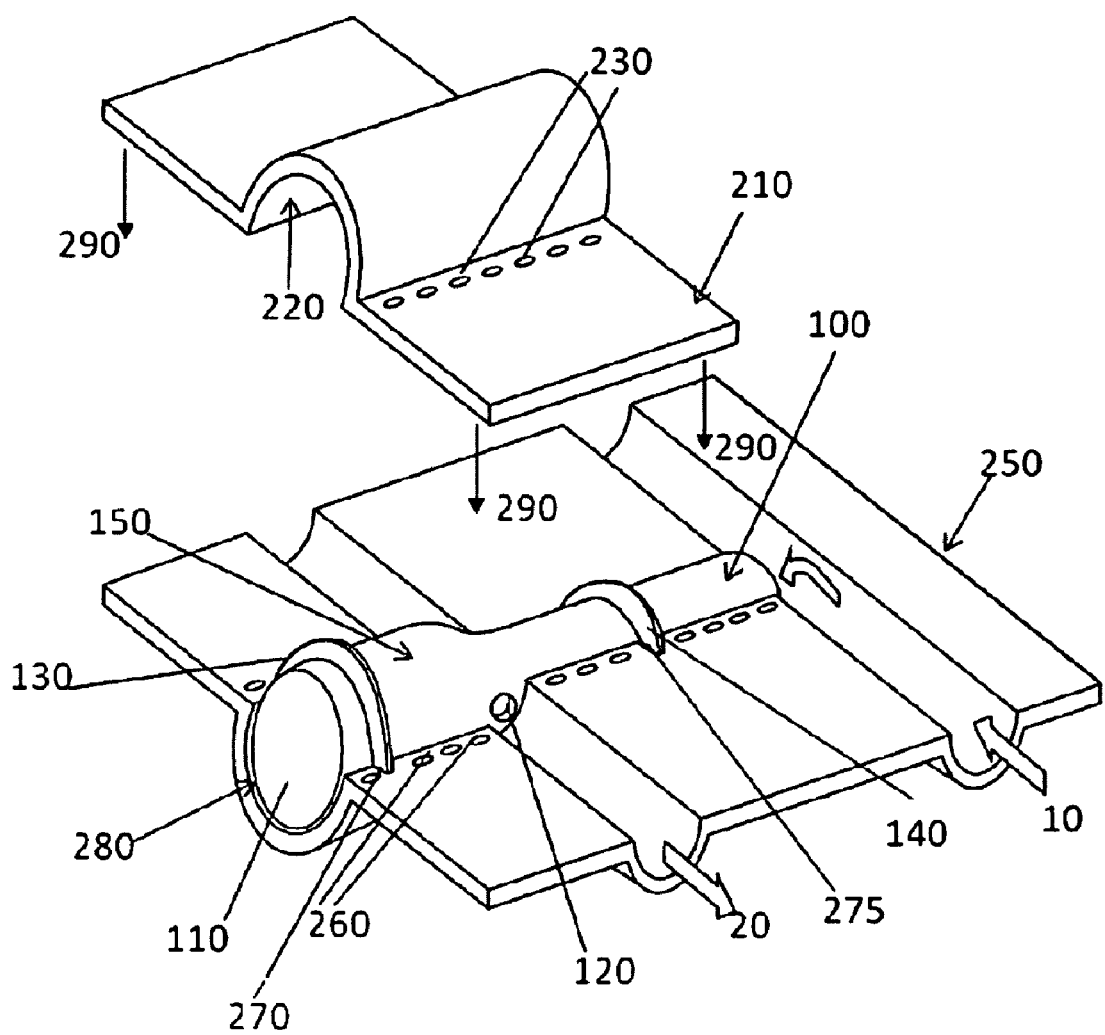
FIG. 3 depicts two unassembled manifold plates and a machine insert.

In one embodiment, external ridges 130, 140 are used for tube placement within the manifold, and may also be used for alignment with the manifold plates (shown in FIG. 3). Surface 150 is machined to create a shape that substantially matches the manifold plates (also shown in FIG. 3). Surface 150 provides the tolerance required for the proper tube insertion of the present invention.

FIG. 3 depicts two unassembled manifold plates 210, 250 and machine insert 100. Utilizing manifold plates 210, 250 provides high volume manufacturing with reduced time and cost. Techniques from the automotive and appliance industries may be used for making and assembling manifold plates 210, 250. In one embodiment, plates 210, 250 are each stamped from a separate sheet of metal. Upper metal plate 210 may be stamped in metal to produce the top half of a network of tubes. Lower metal plate 250 may be similarly stamped in metal to produce the matching bottom half of a network of tubes. Aluminum, steel or other available metals may be used for plates 210, 250.

Plate 210 includes internal surface 220 which substantially matches insert surface 150. When used for insertion placement, ridges 130, 140 may be pressed into plates 210, 250 during the assembly process. If there are gaps in the recesses between plates 210, 250 such that the recesses to not match up completely, ridges 130, 140 may be pressed into those gaps to cover them. Other known techniques may be used for insert 100 placement. For example, ridges 130, 140 may be screw threads which facilitate placement of insert 100 between plates 210 and 250 with a screwing force. Attachment points 230 are located on plate 210 and matching attachment points 260 are located on plate 250. Plates 210, 250 are attached via available methods, such as pressing and then stir welding at points 230, 260. Standard roll bonding may also be used to attach plates 210, 250 with heat and pressure. Machine insert 100 may be manufactured separately from plates 210, 250, and it may be press fit, threaded, or installed using O-rings or other type of seal to provide a liquid tight seal with plates 210, 250. While FIG. 3 shows a smaller upper plate 210 then lower plate 250, the plates may be substantially the same size or upper plate 210 may be larger than lower plate 250.

Slots 270, 275, located on plate 250, substantially match external ridges 130, 140, located on insert 100, such that insert 100 is properly and easily aligned between plates 210, 250. Other commercially available alignment techniques may also be utilized. Surface 280, located on plate 250, substantially matches the outside surface of insert 100 to facilitate proper positioning of insert 100 and improve ease of manufacturing. Arrows 290 show how upper plate 210 is placed down on top of lower plate 250 during the manufacturing process. After plates are 210, 250 are placed together, attachment points 230, 260 are utilized for proper attachment.

Figure 4:
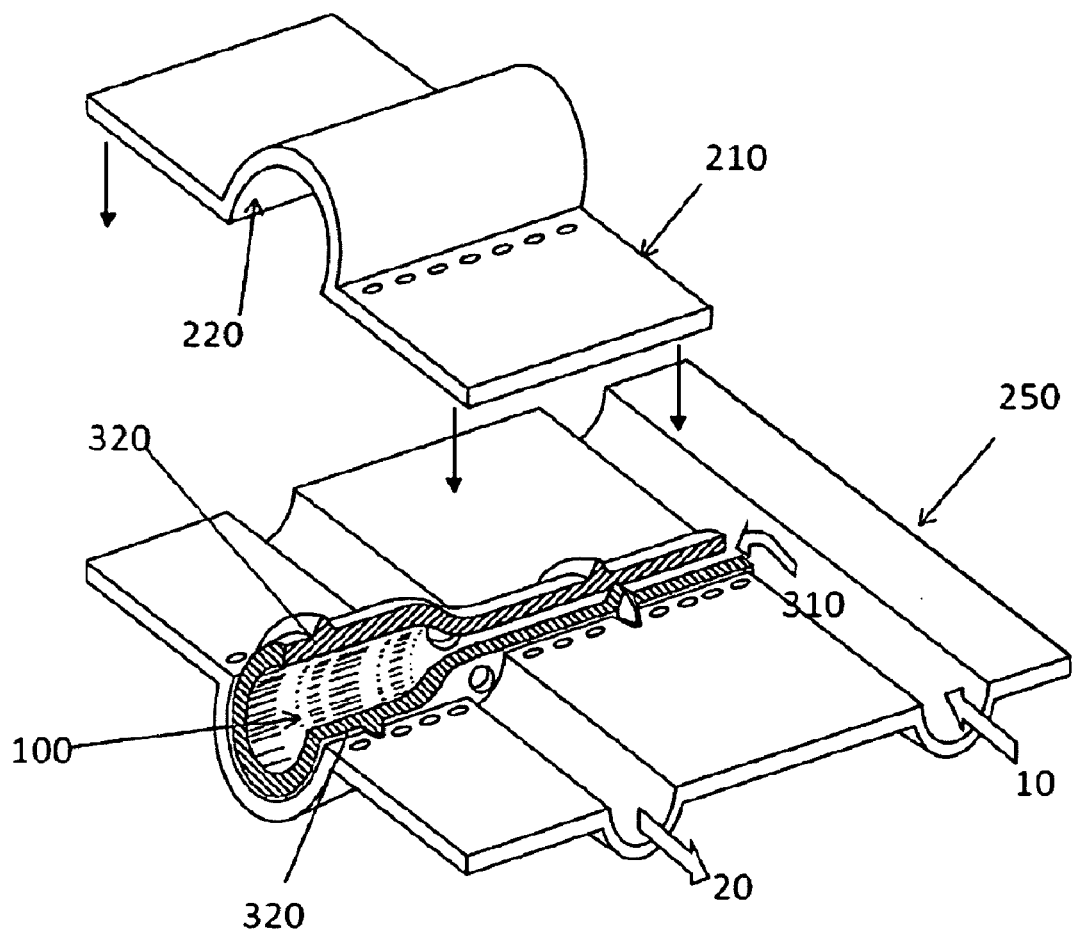
FIG. 4 depicts two unassembled manifold plates and a cross section of a machine insert.

FIG. 4 depicts two unassembled plates 210, 250 and a cross section of machine insert 100. A flow path 310 created with insert 100 allows flows in each direction necessary to manifold the adjacent parallel collector tubes with counter-flowing fluid. In one embodiment, sealing teeth 320 are utilized so that when manifold plates 210, 250 are pressed together, sealing teeth 320 swage themselves into matching teeth located on upper plate 210 to provide a liquid seal. Alternatively, the matching teeth may be located on a top insert portion located within inner surface 220 of upper plate 210. Other commercially available attachment methods may be used for providing a liquid seal for flow path 310.

Figure 5:
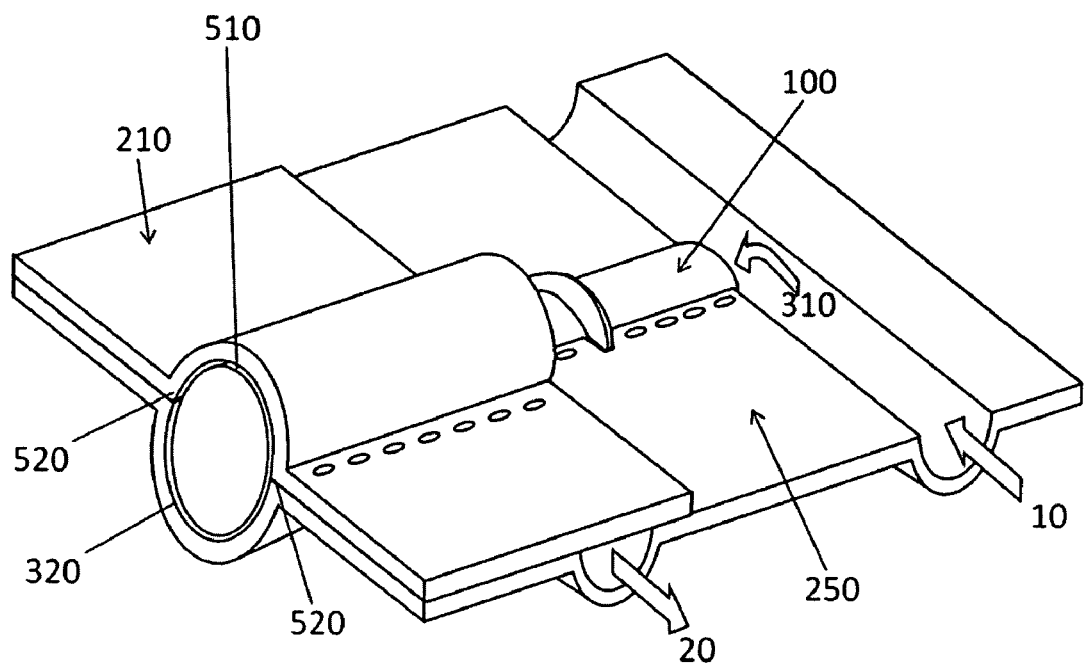
FIG. 5 depicts two assembled manifold plates with a machine insert.

FIG. 5 depicts two assembled plates 210, 250 with placed machine insert 100. Area 510 is sealed with area 320 of insert 100 as set forth above. Area 510 may be an integral part of upper plate 210 or it may be a separate piece attached to upper plate 210 as shown in FIG. 5. A liquid seal is provided in area 520 between areas 320, 510. A separate sealing device or material may also be utilized to prevent flow of fluid between the insert and the surrounding area.

Figure 6:
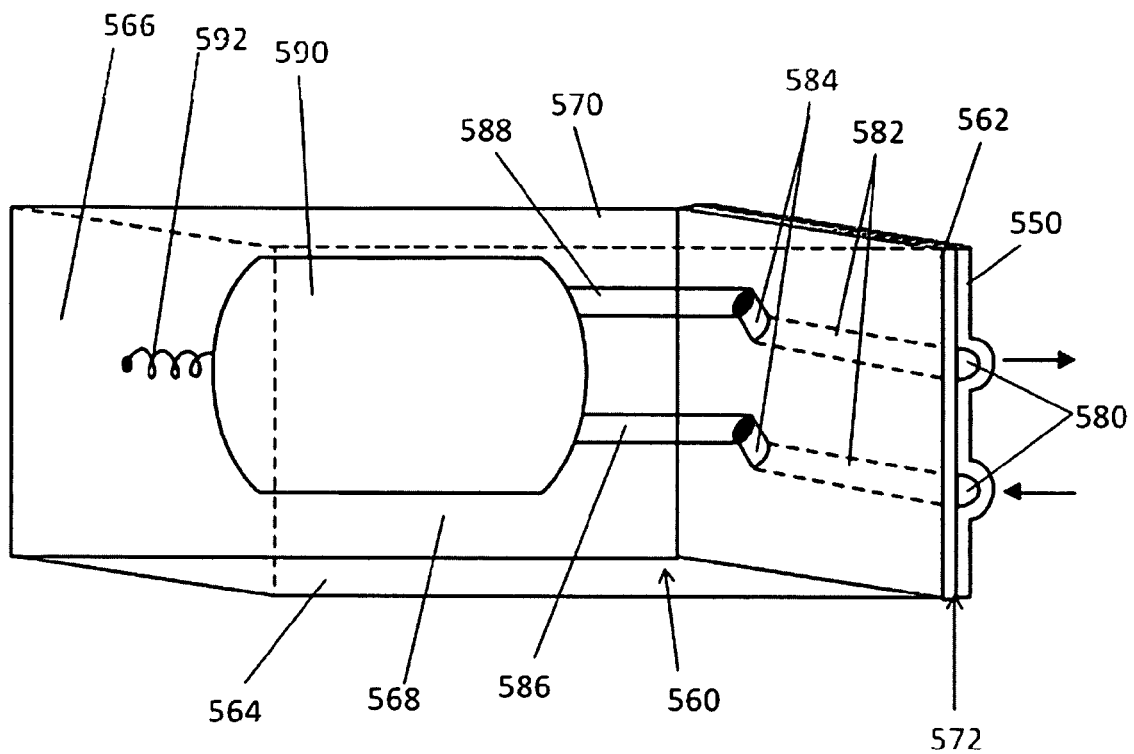
FIG. 6 depicts another embodiment of the invention with a solar thermal panel with one pressed manifold plate assembled with a housing structure.

In another embodiment, lower plate 250 is an integral part of the solar panel support system. As mentioned above, a panel may be used to support one or multiple solar thermal collector tubes. Turning now to FIG. 6, a solar thermal panel is depicted with pressed manifold plate 550, which is assembled with housing structure 560. Housing structure 560 includes mating plate 562 for assembly with pressed plate 550, bottom portion 564, back panel 566, first side panel 568, top panel 570 and a second side panel (not shown in FIG. 6). Thus, in this embodiment, mating plate 562 is integral with back panel 566, and pressed plate 550 along with mating plate 562 form manifold 572 when assembled. As shown in FIG. 6, mating metal plate 562 may be a substantially flat piece and pressed metal plate 550 may include recessed areas 580. Areas 580 may be made via metal pressing techniques. Inserts may be placed into areas 580, or areas 580 may be utilized for direct fluid flow as shown in FIG. 6 (i.e., without inserts).

Areas 580 provide for thermal fluid flow into and out of manifold 572 through internal flow channels 582. The thermal fluid then flows through tubes or inserts 584 to tube inlet 586 and tube outlet 588. Inserts 584 may be placed perpendicular to manifold 572, and inserts 584 may be machine inserts or other available inserts. Welding or other methods may be used for connecting inserts 584 to channels 582, inlet tube 586 and outlet tube 588. Inlet tube 586 and outlet tube 588 are coupled to solar collector tube 590 which is used to heat the fluid for traditional solar thermal purposes. Solar collector tube 590 is coupled to back panel 566 for overall support purposes. This coupling may be done with spring 592. Again, additional solar thermal tubes may be placed adjacent solar collector tube 590 within housing structure 560.

Figure 7:
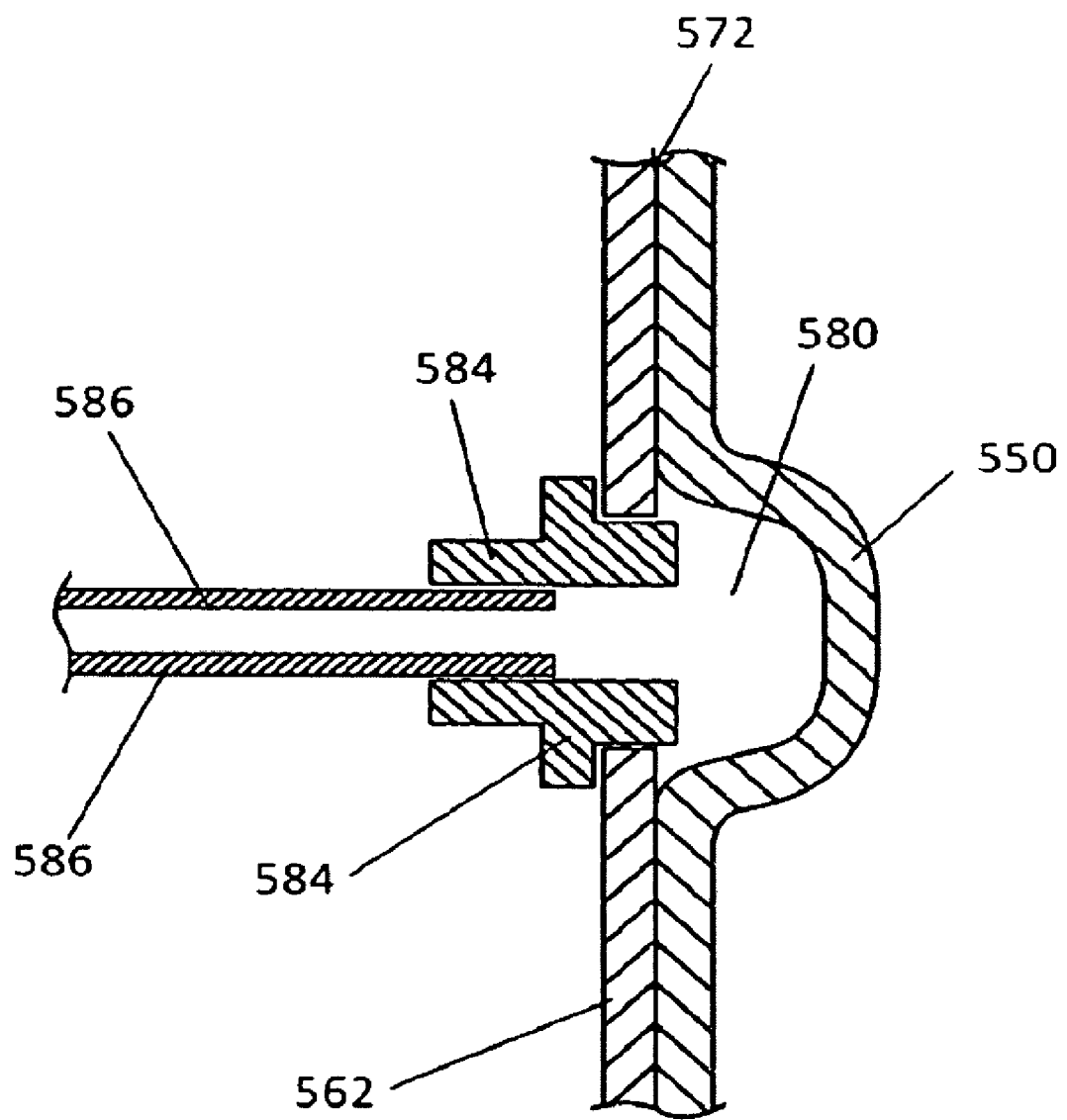
FIG. 7 depicts a cross-section of the manifold, an insert and the inlet tube of FIG. 6.

FIG. 7 depicts a cross-section of manifold 572, insert 584 and inlet tube 586 of FIG. 6. Again, manifold 572 includes pressed plate 550 and mating plate 562. In this embodiment, insert 584 is placed perpendicular to manifold plates 550 and 562. Insert 584 may be attached to mating plate 562 via welding or other known attachment techniques. In addition or as an alternative, a locking mechanism may be used to provide a liquid tight seal between insert 584 and mating plate 562. Insert 584 is also attached to inlet tube 586 via welding or other known techniques. Again, a locking mechanism may be utilized for this attachment. Area 580 supports fluid flow through manifold 572 and insert 584, and into inlet tube 586 for heating in the solar collector tube (not shown in FIG. 7).

Figure 8:
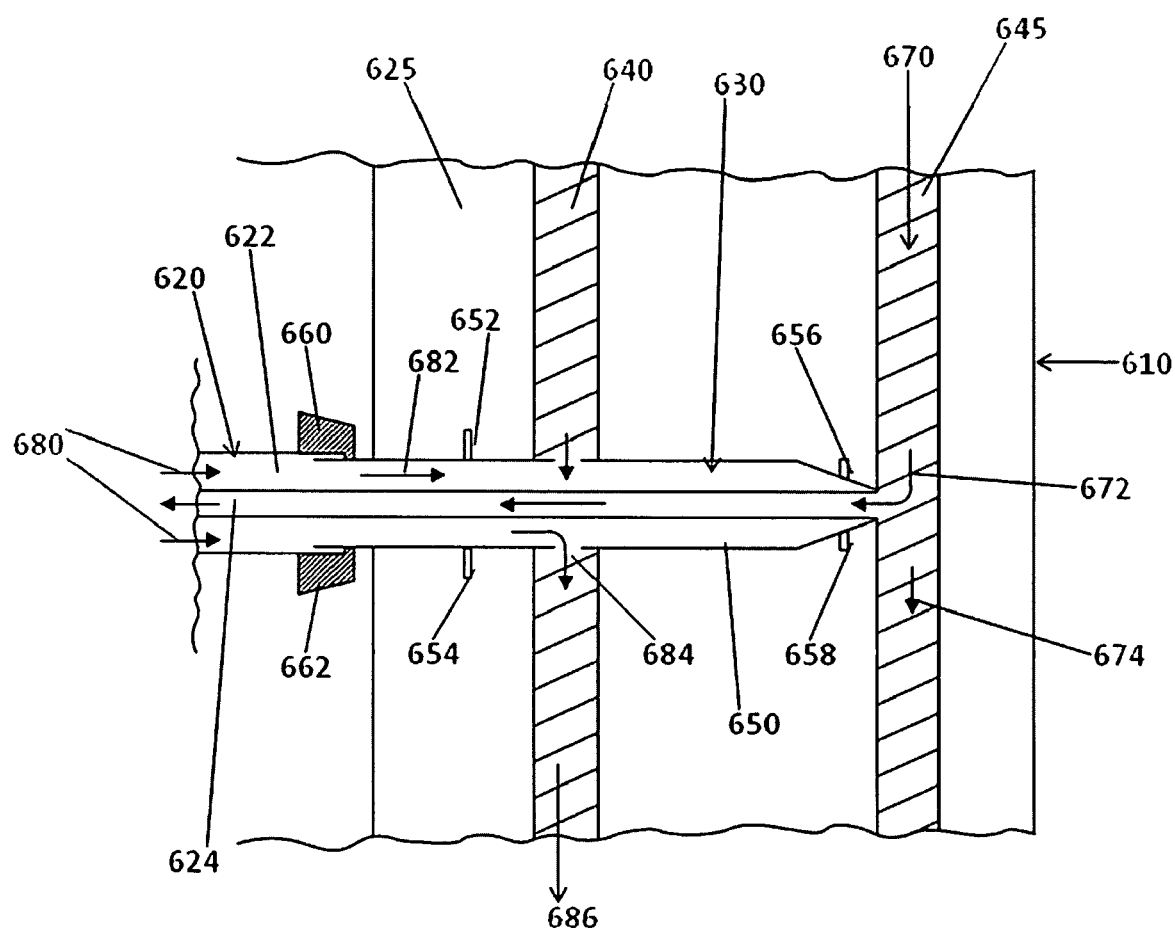
FIG. 8 depicts yet another embodiment of the invention fluid flow through a portion of a solar thermal manifold and through a portion of a collector tube.

FIG. 8 depicts yet another embodiment of the invention with fluid flow through a portion of a solar thermal manifold 610 and through a portion of a collector tube 620. Manifold 610 includes a bottom metal plate 625, a top metal plate (not shown) and an insert 630. Bottom metal plate 625 contains depressions 640 and 645 to facilitate fluid flow through the manifold. The top metal plate may contain matching depressions or may be flat. Insert 630 includes outer wall 650 and ridges 652, 654, 656, 658 for insertion and placement between bottom metal plate 625 and the top metal plate. The shown portion of collector tube 620 includes an outer tube 622 and a inner counter-flow tube 624. Inner tube 624 may extend into manifold 610 and through insert 630 until reaching depression 645 to receive the fluid flow as shown. Outer tube 622 may end before entering manifold 610. Locking mechanisms 660 and 662 are used for coupling outer tube 622 and outer wall 650 such that the fluid does not leak out of the junction between tube 622 and insert 630. Locking mechanisms 660, 662 may be, for example, a flared fitting such as a flare nut.

Fluid flowing through manifold 610 and collector tube 620, enters depression 645 at area 670 and flows into inner tube 624 via flow path 672. Some of the fluid passes by path 672 to other collector tubes (not shown) via flow path 674. Fluid following along path 672 is carried into the solar thermal collector tube and heated therein. The heated fluid is then carried back to manifold 610 via flow path 680 which surrounds flow path 672 in a counter-flow manner. The heated fluid is then carried into insert 630 via flow path 682, into depression 640 via flow path 684, and out of manifold 610 via flow path 686.

Figure 9:
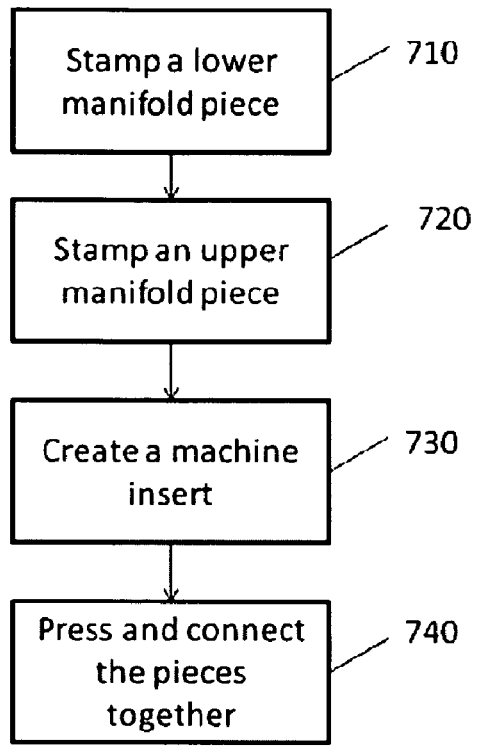
FIG. 9 provides a process flowchart for creating a solar thermal manifold in accordance with the present invention.

FIG. 9 provides a process flowchart for creating a manifold in accordance with the present invention. At step 710, the lower plate is stamped to provide a lower portion of the manifold, and at step 720, the upper plate is optionally stamped to provide an upper portion of the manifold. At step 730, an insert is created for assisting with fluid flow. The lower plate, upper plate and insert are pressed together at step 740. Welding or other commercially available techniques may be used for attaching the pieces in a manner sufficient to withstand the system's environmental exposure and support internal fluid flow.

Figure 10:
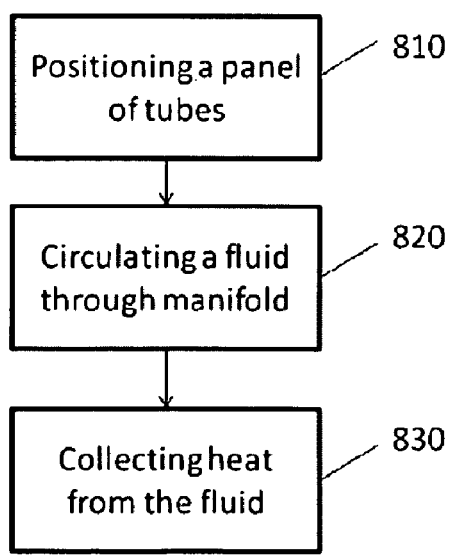
FIG. 10 provides a process flowchart for practicing the disclosed subject matter.

FIG. 10 provides a process flowchart for practicing the disclosed subject matter. At step 810, a panel of collector tubes is positioned to gather solar energy. The tubes are connected to a manifold. At step 820, fluid is circulated through the manifold and through the collector tubes within the panel. A pump may be used for this. At step 830, heat is collected from the circulated fluid.

Although embodiments of the invention have been discussed primarily with respect to specific embodiments thereof, other variations are possible. For example, while the invention has been described with respect to simple solar thermal collector tubes, more complex tubes with special flow paths and configurations may also be used. External reflectors may be utilized to direct solar energy to the collector tubes. Metal pieces may be replaced by sufficiently tolerant plastic, polymer pieces or the like. Steps can be added to, taken from or modified from the steps in this specification without deviating from the scope of the invention. In general, any flowcharts presented are only intended to indicate one possible sequence of basic operations to achieve a function, and many variations are possible. The invention may be practiced in numerous applications, including commercial and residential.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the spirit and scope of the present invention, which is more particularly set forth in the appended claims. Furthermore, those of ordinary skill in the art will appreciate that the foregoing description is by way of example only, and is not intended to limit the invention. Thus, it is intended that the present subject matter covers such modifications and variations as come within the scope of the appended claims and their equivalents.

What is claimed is:

1. A solar collector manifold, comprising:
a first manifold plate;
a second manifold plate;
a manifold inlet port;
a manifold outlet port; and
a solar collector tube connection port that defines an external opening into the manifold and is constructed and arranged to connect to a fluid tube of a solar collector tube;
wherein the first manifold plate and the second manifold plate are joined together to enclose therebetween a network of fluid flow paths that comprises an inlet fluid flow path that conveys fluid from the manifold inlet port, an outlet fluid flow path that conveys fluid to the manifold outlet port, and a fluid exchange path that conveys fluid between the solar collector tube connection port and at least one of the inlet fluid flow path and the outlet fluid flow path;
wherein the solar collector tube connection port comprises an insert that defines at least a portion of the fluid exchange path and additionally defines a counter-flow path.

2. The solar collector manifold of claim 1, wherein the insert comprises a first port that opens into the inlet fluid flow path and a second port that opens into the outlet fluid flow path.

3. The solar collector manifold of claim 1, wherein the first manifold plate and the second manifold plate are joined together to enclose the network of fluid flow paths with fluid tight seal.

4. The solar collector manifold of claim 1, wherein the first manifold plate and the second manifold plate are stamped metal plates at least one of which comprises stamped depressions that define the inlet fluid flow path and the outlet fluid flow path between the first manifold plate and the second manifold plate.

5. The solar collector manifold of claim 1, wherein the first manifold plate and the second manifold plate are welded together.

6. The solar collector manifold of claim 1, wherein the insert defines the fluid exchange path between the solar collector tube connection port and the inlet fluid flow path.

7. The solar collector manifold of claim 6, wherein the insert defines the fluid exchange path between the solar collector tube connection port and the outlet fluid flow path.

8. The solar collector manifold of claim 6, wherein the insert comprises a first port that opens into the inlet fluid flow path and a second port that opens into the outlet fluid flow path.

9. The solar collector manifold of claim 1, wherein the solar collector tube connection port comprises a surface sized to mate with a surface of the fluid tube of the solar collector tube.

10. The solar collector manifold of claim 1, wherein the inlet fluid flow path, the outlet fluid flow path, and the fluid exchange path are coplanar.

11. A solar collector manifold, comprising:
a first manifold plate;
a second manifold plate;
a manifold inlet port;
a manifold outlet port; and
a solar collector tube connection port that defines an external opening into the manifold and is constructed and arranged to connect to a fluid tube of a solar collector tube;
wherein the first manifold plate and the second manifold plate are joined together to enclose therebetween a network of fluid flow paths that comprises an inlet fluid flow path that conveys fluid from the manifold inlet port, an outlet fluid flow path that conveys fluid to the manifold outlet port, and a fluid exchange path that conveys fluid between the solar collector tube connection port and at least one of the inlet fluid flow path and the outlet fluid flow path;
wherein the solar collector tube connection port comprises an insert that defines at least a portion of the fluid exchange path, wherein and the insert comprises an external ridge that fixes the insert to each of the first manifold plate and the second manifold plate.

12. The solar collector manifold of claim 11, wherein the external ridge is embedded into each of the first manifold plate and the second manifold plate.

13. The solar collector manifold of claim 11, wherein the external ridge is a screw thread.

14. The solar collector manifold of claim 11, wherein the external ridge of the insert mates with matching recesses in the first manifold plate and the second manifold plate.

15. A solar collector manifold, comprising:
a first manifold plate;
a second manifold plate;
a manifold inlet port;
a manifold outlet port; and
a solar collector tube connection port that defines an external opening into the manifold and is constructed and arranged to connect to a fluid tube of a solar collector tube;
wherein the first manifold plate and the second manifold plate are joined together to enclose therebetween a network of fluid flow paths that comprises an inlet fluid flow path that conveys fluid from the manifold inlet port, an outlet fluid flow path that conveys fluid to the manifold outlet port, and a fluid exchange path that conveys fluid between the solar collector tube connection port and at least one of the inlet fluid flow path and the outlet fluid flow path;
wherein the solar collector tube connection port comprises an insert that defines at least a portion of the fluid exchange path, the solar collector tube connection port comprises an interior surface defining a first cylindrical channel portion and a second cylindrical channel portion, the first cylindrical channel portion terminates at the external opening into the manifold, the second cylindrical channel portion forms at least a portion of the fluid exchange path, and the first cylindrical channel portion has a larger internal cross-sectional diameter than the second cylindrical channel portion.

16. A solar collector manifold, comprising:
a first manifold plate;
a second manifold plate;
a manifold inlet port;
a manifold outlet port; and
a solar collector tube connection port that defines an external opening into the manifold and is constructed and arranged to connect to a first fluid tube of a solar collector tube;
wherein the first manifold plate and the second manifold plate are joined together to enclose therebetween a network of fluid flow paths that comprises an inlet fluid flow path that conveys fluid from the manifold inlet port, an outlet fluid flow path that conveys fluid to the manifold outlet port, and a fluid exchange path that conveys fluid between the solar collector tube connection port and at least one of the inlet fluid flow path and the outlet fluid flow path;
wherein the solar collector tube connection port is constructed and arranged to connect the inlet fluid flow path and the outlet fluid flow path to a coaxial arrangement of the first fluid tube of the solar collector tube and an outer fluid tube of the solar collector tube, the solar collector tube connection port comprises an insert that defines at least a portion of the fluid exchange path, the insert defines a channel between the inlet fluid flow path and the external opening, the channel being sized to receive an extension of the first fluid tube of the solar collector tube through the external opening to an internal opening into the inlet fluid flow path, and at the external opening the insert is constructed and arranged to connect to the outer fluid tube of the solar collector tube that is coaxial with the first fluid tube.

17. The solar collector manifold of claim 16, wherein the insert comprises a port that opens into the outlet fluid flow path, and the fluid exchange path is defined between the insert and an outer surface of the first fluid tube of the solar collector tube.

18. A method, comprising:
forming a first manifold plate and a second manifold plate at least one of which comprises depressions;
joining together the first manifold plate and the second manifold plate to enclose therebetween a solar collector tube connection port and a network of fluid flow paths that comprises an inlet fluid flow path that conveys fluid from a manifold inlet port, an outlet fluid flow path that conveys fluid to a manifold outlet port, and a fluid exchange path that conveys fluid between the solar collector tube connection port and at least one of the inlet fluid flow path and the outlet fluid flow path, wherein the solar collector tube connection port defines an external opening into the manifold and is constructed and arranged to connect to a fluid tube of a solar collector tube;

creating an insert that defines at least a portion of the fluid exchange path, wherein the insert comprises an external ridge; and fixing the insert between the first manifold plate and the second manifold plate, wherein the fixing comprises pressing the first manifold plate and the second manifold plate together with the insert therebetween such that the external ridge is embedded into each of the first manifold plate and the second manifold plate.

19. The method of claim 18, wherein the insert comprises a first port that opens into the inlet fluid flow path and a second port that opens into the outlet fluid flow path.

20. The method of claim 18, wherein the forming comprises stamping the depressions in the at least one of the first manifold plate and the second manifold plate.

21. The method of claim 18, wherein the joining comprises welding the first manifold plate and the second manifold plate together.

22. A method, comprising:

obtaining solar collector tubes;

obtaining a manifold that comprises a first manifold plate, a second manifold plate, and for each of the solar collector tubes a respective solar collector tube connection port that defines an external opening into the manifold and is constructed and arranged to connect to a respective fluid tube of the solar collector tube, wherein the first manifold plate and the second manifold plate are joined together to enclose therebetween a network of fluid flow paths that comprises an inlet fluid flow path, an outlet fluid flow path, and for each of the solar collector tubes a respective fluid exchange path that conveys fluid between the respective solar collector tube connection port and at least one of the inlet fluid flow path and the outlet fluid flow path; and connecting the manifold to the solar collector tubes arranged in an array, wherein the connecting comprises for each of the solar collector tubes connecting the respective fluid tube of the solar collector tube to the respective solar collector tube connection port of the manifold;

wherein each of the solar collector tube connection ports comprises a respective insert that defines at least a portion of the respective fluid exchange path and provides a counter-flow path for the fluid, and the connecting comprises connecting each of the inserts to a respective one of the fluid tubes of the solar collector tubes.

23. The method of claim 22, wherein the first manifold plate and the second manifold plate are stamped metal plates least one of which comprises stamped depressions that define the inlet fluid flow path and the outlet fluid flow path between the first manifold plate and the second manifold plate.

24. The method of claim 22, wherein each of the inserts comprises a flow port that provides cross flow of the fluid through the insert.

\* \* \* \* \*